United States Patent
Yasukawa (10) Patent No.: US 9,720,780 B2
(45) Date of Patent: Aug. 1, 2017

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Takuma Yasukawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 14/692,525

(22) Filed: Apr. 21, 2015

(65) Prior Publication Data

US 2015/0309879 A1 Oct. 29, 2015

(30) Foreign Application Priority Data

Apr. 24, 2014 (JP) ................ 2014-090056

(51) Int. Cl.
   - *G06F 11/14* (2006.01)
   - *G06F 21/00* (2013.01)
   - *G06F 21/62* (2013.01)

(52) U.S. Cl.
   CPC ...... *G06F 11/1451* (2013.01); *G06F 11/1415* (2013.01); *G06F 11/1469* (2013.01); *G06F 21/00* (2013.01); *G06F 21/6209* (2013.01)

(58) Field of Classification Search
   CPC ............. G06F 11/1415; G06F 11/1469; G06F 11/1451; G06F 21/6209; G06F 21/00; G06F 11/0793; G06F 11/1076; G06F 11/1435; G06F 11/1456
   See application file for complete search history.

(56) References Cited

U.S. PATENT DOCUMENTS

| | | | |
|---|---|---|---|
| 8,041,959 B2 * | 10/2011 | Kito ................... | G06F 11/1435 380/277 |
| 2011/0314221 A1 * | 12/2011 | Kawada ............. | G06F 11/1456 711/114 |

FOREIGN PATENT DOCUMENTS

| | | |
|---|---|---|
| JP | 8-46685 A | 2/1996 |
| JP | 11-96083 A | 4/1999 |

* cited by examiner

*Primary Examiner* — Nadeem Iqbal
(74) *Attorney, Agent, or Firm* — Canon USA, Inc. I.P. Division (57) ABSTRACT

An information processing apparatus protects data stored in a storage device by saving setting data stored on a first storage device to a second storage device when the first storage device fails, or when an encryption function is enabled or disabled. The process of protecting the date includes, after a reservation for saving setting data is made, saving the setting data, cancelling the reservation, and making a reservation for restoring the setting data. If the setting data is to be restored, it is determined whether the reservation for restoring the setting data has been made, and if the reservation has been made, the setting data is restored to the first storage device.

8 Claims, 6 Drawing Sheets

INFORMATION PROCESSING APPARATUS, INFORMATION PROCESSING METHOD, AND PROGRAM

BACKGROUND

Field

Aspects of the present invention generally relate to an information processing apparatus, an information processing method, and a program. More particularly, the present invention relates to an information processing apparatus for storing data on a storage device.

Description of the Related Art

Image forming apparatuses equipped with a hard disk drive (HDD) have been known. Various kinds of data as well as programs can be stored on the HDD. In such image forming apparatuses, when HDD failure occurs, there is a risk that the data stored on the HDD may be lost. In such a case, depending on the data, the data stored on the HDD cannot be easily restored. For example, user setting values are individually set and frequently rewritten by each user. Consequently, if the user setting values stored on the HDD cannot be read, it is difficult to restore the user setting values. Similarly to the user setting values, if device setting values stored on the HDD cannot be read, it is also difficult to restore the device setting values. On the HDD, in the event of failure in a storage area other than the storage area which stores the user setting values and the device setting values, replacement of the HDD may also cause loss of the user setting values and the device setting values. Such problems may arise in other storage devices besides the HDD.

Moreover, if an encryption function for encrypting writing data on a HDD is enabled, the data that has already been written on the HDD without encryption cannot be read. If the encryption function is disabled, the encrypted data cannot be used without a decryption function. Consequently, it may become impossible to use the data that has been already stored on the HDD before the encryption function is enabled or disabled. Such a problem may arise in any storage media that can have the encryption function as well as the HDD.

Japanese Patent Application Laid-Open No. 8-46685 discloses a technique for writing data in a plurality of HDDs in parallel. When failure occurs in one of the HDDs, from the normal HDD, the difference between the data written to the failed HDD and the data written to the normal HDDs is restored onto the recovered HDD. Japanese Patent Application Laid-Open No. 11-96083 discloses a technique for saving data when power supply is turned off, and restoring the saved data after power is supplied.

According to the techniques, however, processing load will increase when data is written in a plurality of HDDs, and areas storing the data will also increase. Moreover, if data is saved when HDD failure occurs, and the data is internally rewritten in the HDD after the data is saved, mismatch may occur between the last stored data when power supply is turned off, and the saved data.

SUMMARY

Aspects of the present invention are generally directed to readily and surely protecting data stored on a storage device.

According to an aspect of the present invention, an information processing apparatus includes a first setting unit configured to set reservation information for making a reservation to save setting data stored in a first storage device, that should be saved to a second storage device, to the second storage device, a saving unit configured to save the setting data stored in the first storage device to the second storage device after the reservation information is set by the first setting unit, and a stopping unit configured to stop operation of the first storage device after the setting data stored in the first storage device is saved to the second storage device by the saving unit.

Further features of the present disclosure will become apparent from the following description of exemplary embodiments with reference to the attached drawings.

DESCRIPTION OF THE EMBODIMENTS

Exemplary embodiments will be described below with reference to the attached drawings.

Figure 1:
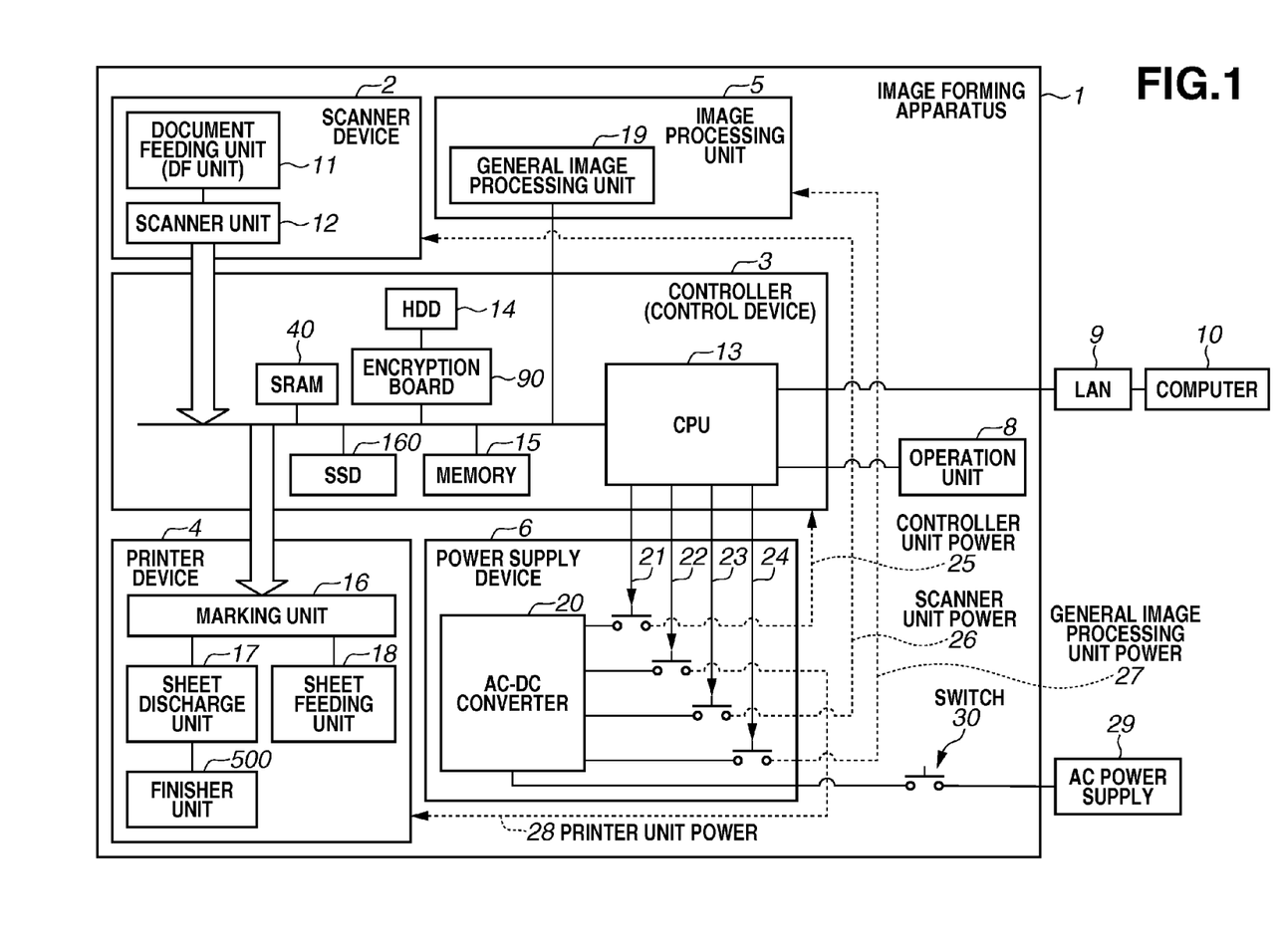
FIG. 1 illustrates a configuration of an image forming apparatus.

FIG. 1 is a block diagram illustrating a configuration of an image forming apparatus 1.

The image forming apparatus 1 includes a scanner device 2, a controller (control device) 3, a printer device 4, an image processing unit 5, a power supply device 6, an operation unit 8, and a switch 30.

The scanner device 2 is an engine which optically reads an image on a document, and converts the read image into a digital image. The scanner device 2 includes a document feeding unit 11 and a scanner unit 12. The document feeding unit 11 feeds a document. The document feeding unit 11 can automatically and successively switch documents to be scanned by the scanner unit 12. The scanner unit 12 optically reads an image on the document fed by the document feeding unit 11, and converts the image into a digital image. The data of the converted digital image is sent to the controller 3.

The printer device 4 is an engine for outputting the digital image to a sheet device. The printer unit 4 includes a marking unit 16, a sheet discharge unit 17, a sheet feeding unit 18, and a finisher unit 500.

The sheet feeding unit 18 successively feeds sheets one by one from a stack of sheets. The marking unit prints image data onto the sheet fed by the sheet feeding unit 18. The sheet discharge unit 17 discharges the printed sheets. The finisher unit 500 performs post-processing onto the sheet discharged by the sheet discharge unit 17.

The image processing unit 5 performs image processing to image data. The image processing unit 5 includes a general image processing unit 19. The general image processing unit 19 performs, for example, processing such as reduction on the image data stored in a memory 15, and stores the processed image data in the memory 15 again.

The operation unit 8 receives operations performed on the image forming apparatus 1 by an user, and displays various kinds of information. The operation unit 8 can display, for example, a job status, and a status of the engine, such as the scanner device 2 and the printer device 4.

The controller 3 is connected to the individual modules in the image forming apparatus 1 such as the scanner device 2, the printer device 4, the image processing unit 5, and the power supply device 6. The controller 3 performs various kinds of control to execute a job in the image forming apparatus 1 by issuing instructions to the modules.

The controller 3 includes an HDD 14. The HDD 14 stores, in addition to the image data, data such as user setting values and device setting values.

The controller 3 includes a central processing unit (CPU) 13. The image forming apparatus 1 can interpret operations performed on the operation unit 8 by a user or instructions from a local area network (LAN) 9 and execute various kinds of jobs according to the instructions. The controller 3, for example, executes a job by sending and receiving image data between the scanner device 2 and the printer device 4 and storing the image data.

The controller 3 temporarily stores the image data received from the scanner device 2 in the memory 15. The memory 15 is a volatile memory. The controller 3 stores the image data temporarily stored in the memory 15 in the HDD 14. Thus, the scanning and storage of the image is completed.

The controller 3 temporarily stores the image data stored in the HDD 14 in the memory 15, and sends the image data from the memory 15 to the printer device 4. The printer device 4 outputs a print based on the sent image data. As described above, the image data stored in the memory 15 may be processed by the general-purpose image processing unit 19 and stored in the memory 15 again.

The controller 3 includes an encryption board 90. The encryption board 90 is detachably disposed between the CPU 13 and the HDD 14. The encryption board 90 encrypts data and writes the encrypted data onto the HDD 14. The encryption board 90, in addition, reads the encrypted data stored on the HDD 14 and decrypts the data.

The controller 3 includes a static random access memory (SRAM) 40 and a solid-state drive (SSD) 160. The SRAM 40 is a nonvolatile memory, and continuously stores various kinds of data even after the power supply to the image forming apparatus 1 is turned off. The SSD 160 stores a program to be executed by the CPU 13 of the controller 3. The SSD 160 can be also used, similarly to the SRAM 40, to store various kinds of data such as setting values.

The power supply device 6 supplies electric power to the image forming apparatus 1. The power supply device includes an alternating current-direct current (AC-DC) converter 20. When the switch 30 (image forming apparatus 1) is turned off, an AC power supply 29 is isolated from the AC-DC converter 20. When the switch 30 is turned on, AC power is supplied to the AC-DC converter 20, and the AC-DC converter 20 generates DC power. The image forming apparatus 1 according to the exemplary embodiment can control four independent power supplies according to an instruction from the CPU 13. Specifically, the OFF/ON control of a controller unit power 25 is performed based on a switch control signal 21 from the CPU 13. Similarly, each OFF/ON control of a printer unit power 28, a scanner unit power 26, and a general image processing unit power 27 is performed by a switch control signal 22, a switch control signal 23 and a switch control signal 24, respectively. The CPU 13 uses the switch control signals to 24 to appropriately supply electric power to a necessary portion of the image forming apparatus 1.

The image forming apparatus 1 can also input and output a digital image to and from a computer 10 via the LAN 9, issue a job, and give instructions to a device.

Figure 2:
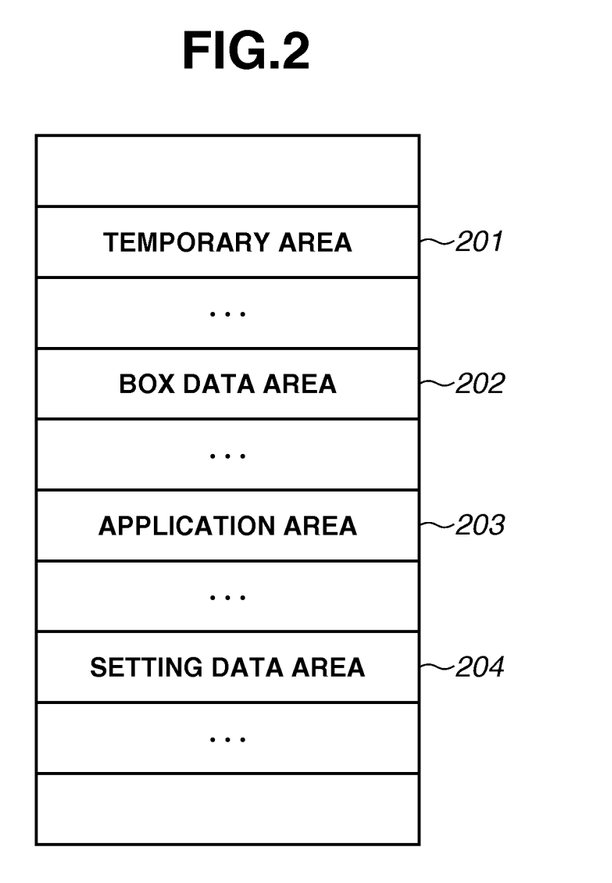
FIG. 2 illustrates a data configuration of a hard disk drive (HDD).

FIG. 2 illustrates an example of a data configuration of the HDD 14.

In FIG. 2, a temporary area 201 stores data to be temporarily used when, for example, the image forming apparatus 1 decompresses a compressed image.

A BOX data area 202 stores data to be processed by a BOX function for printing and sending a scan image stored in the HDD 14 or other areas.

An application area 203 stores applications that can be installed later on and used by a user.

A setting data area 204 stores, for example, user setting values and device setting values. The device setting values include values given to individual image forming apparatuses 1, such as a value to be set at a factory according to individual differences of the image forming apparatuses 1, and a value to be set (changed) according to an operation of the image forming apparatus 1 or a predetermined operation of the operation unit 8 by a service staff. Specifically, the device setting values include, for example, various kinds of counters such as a billing counter and an individual counter for each section, an image density adjustment value, an image position adjustment value, security information, transmission job information, reception job information, facsimile job information, and service staff logs. The user setting values include values given to individual users of the image forming apparatus 1, as values set (changed) according to a predetermined operation of the user of the image forming apparatus 1. Specifically, the user setting values include, for example, user management information. In the description below, the data stored in the setting data area 204 is referred to as setting data as necessary. As long as the setting data is to be saved on the SSD 160, the setting data is not limited to the device setting values and the user setting values. It is preferable that, like the device setting values, data that is not readily restored if the data is not read from the HDD 14 is included in the setting data.

Figure 3:
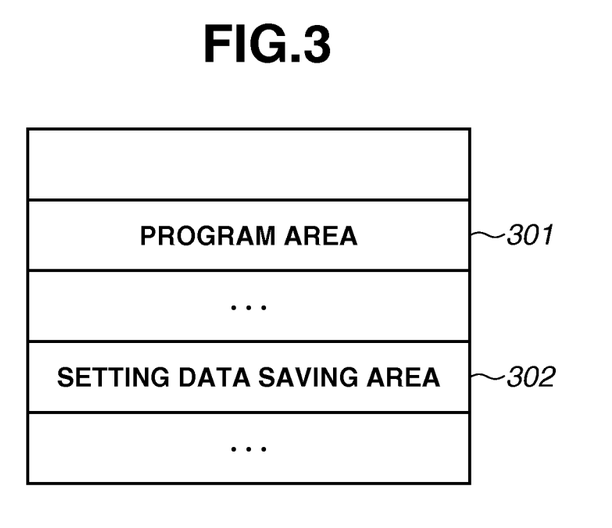
FIG. 3 illustrates an example of a data configuration of a solid-state drive (SSD).

FIG. 3 illustrates an example of a data configuration of the SSD 160.

In FIG. 3, a program area 301 stores a program to be executed by the CPU 13 of the controller 3.

A setting data saving area 302 temporarily saves setting data stored in the setting data area 204 of the HDD 14. Adequate size for saving the data is allocated to the setting data saving area 302.

Figure 4:
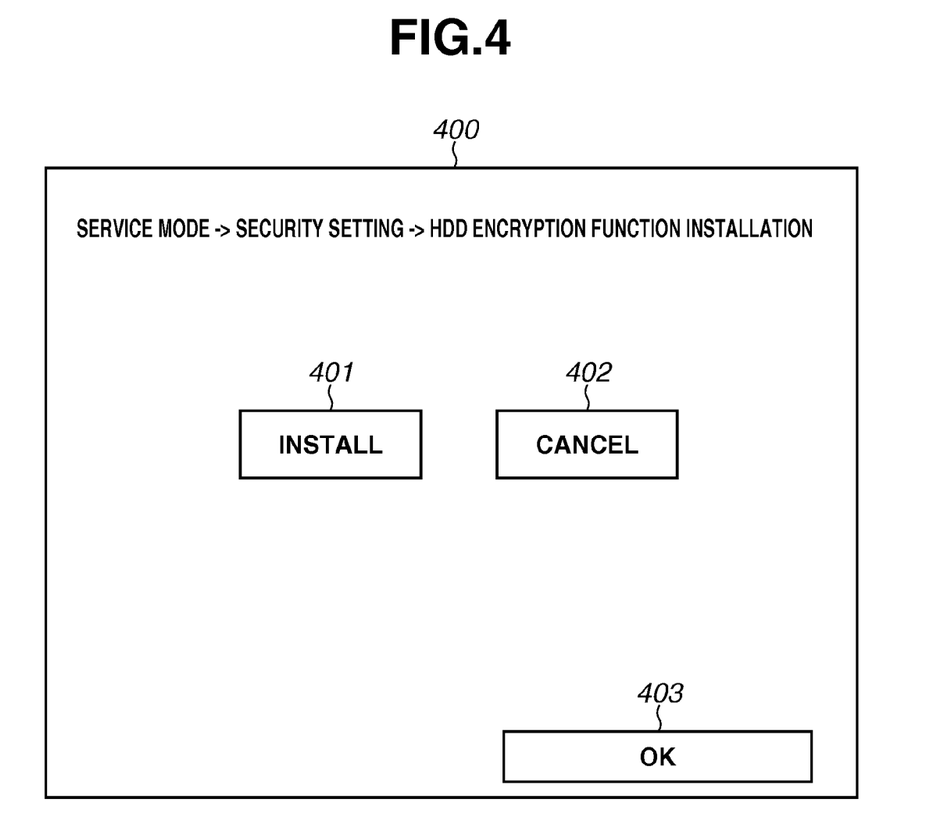
FIG. 4 illustrates a graphical user interface (GUI) displayed in setting an encryption function of the HDD.

FIG. 4 illustrates an example of a graphic user interface (GUI) displayed on the operation unit 8 in setting the encryption function of the HDD 14.

When a service staff installs the encryption board 90 in the image forming apparatus 1, the service staff operates the operating unit 8 to issue an instruction to display a GUI 400 illustrated in FIG. 4. After installing the encryption board 90 in the image forming apparatus 1, the service staff selects an install button 401 and presses an OK button 403. This enables the user to carry out the encryption function of the HDD 14 (that is, encryption of the data stored on the HDD 14 can be performed) after the next startup of the image forming apparatus 1. On the other hand, when a service staff removes the encryption board 90 from the image forming apparatus 1, the service staff operates the operating unit to issue an instruction to display the GUI 400 illustrated in FIG. 4. After removing the encryption board 90 from the image forming apparatus 1, the service staff selects a cancel button 402 and presses the OK button 403. This disables the encryption function in the HDD 14 (that is, the data stored on the HDD 14 will not be encrypted) after the next startup of the image forming apparatus 1.

The GUI 400 may be displayed after installation or removal of the encryption board 90. Further, the GUI 400 may be removed before the installation or the removal of the encryption board 90.

Figure 5:
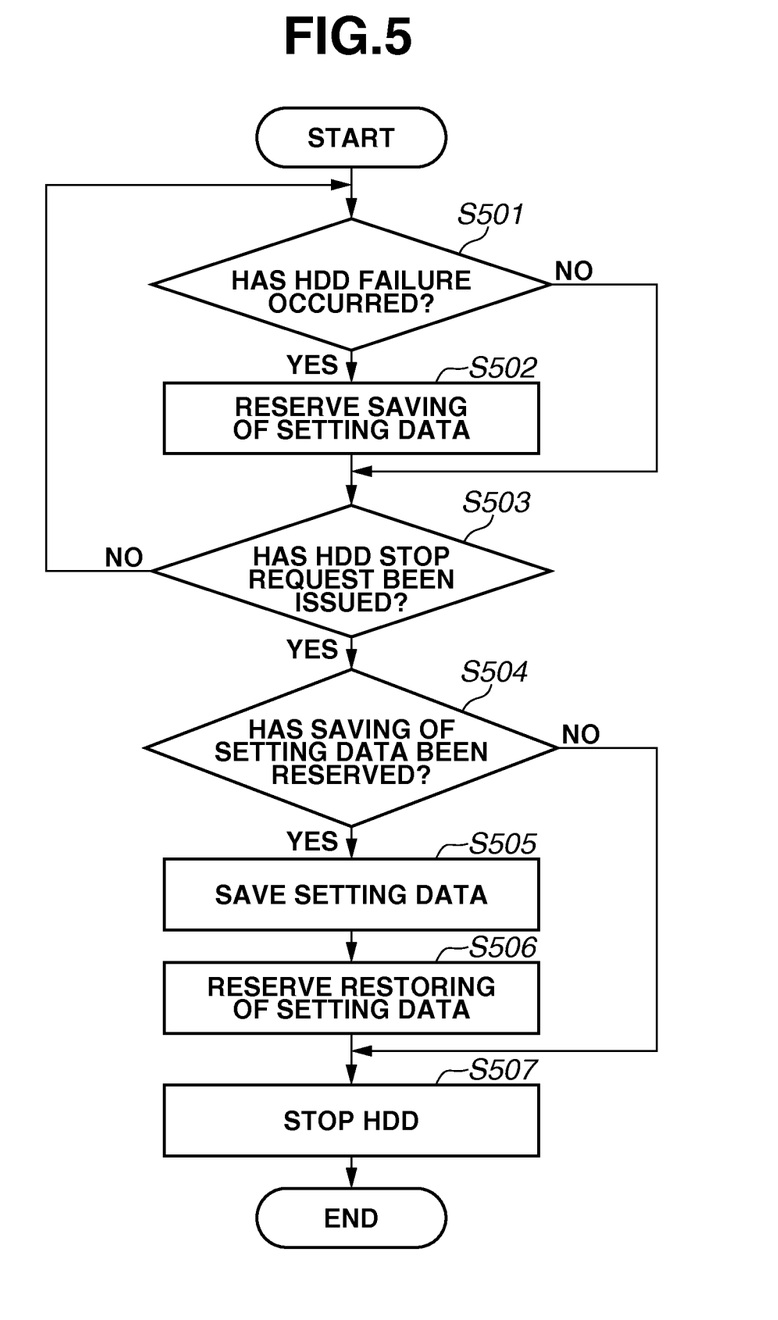
FIG. 5 is a flowchart illustrating processing to be performed by the image forming apparatus when HDD failure occurs.

With reference to the flowchart in FIG. 5, the following describes an example of processing performed by the image forming apparatus 1 from an occurrence of failure in the HDD 14 until the HDD 14 is stopped. The flowchart in FIG. 5 illustrates an example where the data on the HDD 14 is saved onto the SSD 160 when failure of the HDD 14 is detected. The flowchart illustrated in FIG. 5 is implemented, for example, by executing a program stored on the SSD 160 by the CPU 13 of the controller 3.

In step S501, the controller 3 performs failure determination processing for determining whether failure has occurred in the HDD 14. As a result of the determination, if failure has occurred in the HDD 14 (YES in step S501), the processing proceeds to step S502. If failure has not occurred in the HDD 14 (NO in step S501), the processing omits step S502 and proceeds to step S503.

In step S502, the controller 3 make a reservation for saving the setting data stored in the setting data area 204 of the HDD 14 to the SSD 160, and the processing proceeds to step S503. The reservation is implemented, for example, by executing first setting processing for setting, as an example of reservation information, information indicating that there is the reservation in a storage medium within the image forming apparatus 1 other than the HDD 14, which is a saving source of the setting data. Specifically, an area for storing "1" or "0 (zero)" which indicates whether there is the reservation is provided in the SDD 160. The controller 3 changes the information in the area of the SSD 160 from "0" to "1" to perform the reservation.

In step S503, the controller 3 performs stop request determination processing for determining whether a request for stopping the HDD 14 has been issued. As a result of the determination, if a request for stopping the HDD 14 has been issued (YES in step S503), the processing proceeds to step S504. If a request for stopping the HDD 14 has not been issued (NO in step S503), the processing returns to step S501. The request for stopping the HDD 14 is performed, for example, according to an operation of the operation unit 8 by a service staff.

When the request for stopping the HDD 14 has been issued, the processing proceeds to step S504, and then, the controller 3 performs first reservation determination processing for determining whether the reservation for saving the setting data has been made. If the reservation for saving the setting data has been made (YES in step S504), the processing proceeds to step S505. If the reservation for saving the setting data has not been made (NO in step S504), the processing omits steps S505 and S506, and proceeds to step S507 described below.

In step S505, the controller 3 saves the setting data from the setting data area 204 of the HDD 14 to the setting data saving area 302 of the SSD 160. The setting data can be saved by either moving or copying the setting data on the HDD 14 to the SSD 160. Then, the controller 3 cancels the reservation for saving the setting data. The reservation is cancelled, for example, by storing information indicating that there is not the reservation on a storage medium within the image forming apparatus 1 other than the HDD 14, which is the saving source of the setting data. In the above-described example, the controller 3 makes the reservation by changing information in the area storing the information which indicates whether there is the reservation from "0" to "1". Consequently, the controller 3 cancels the reservation by changing the information in the area from "1" to "0".

In step S506, the controller 3 make a reservation for restoring the setting data from the setting data storing area 302 of the SSD 160 to the setting data area 204 of the HDD 14, and the processing proceeds to step S507. The reservation is implemented, for example, by executing second setting processing for setting, as an example of second reservation information, information indicating that there is the reservation on a storage medium within the image forming apparatus 1 other than the HDD 14, which is the saving source of the setting data. Specifically, an area for storing "1" or "0 (zero)," which indicates whether there is the reservation, is provided in the SDD 160. The controller 3 changes the information in the area of the SSD 160 from "0" to "1" to make the reservation. The area provided in the SSD 160 is different from the area storing the information indicating whether there is a reservation for saving the setting data.

In step S507, the controller 3 stops the operations of the HDD 14. Then, the HDD 14 is removed for replacement or repair.

Then, the processing according to the flowchart in FIG. 5 is ended.

Figure 6:
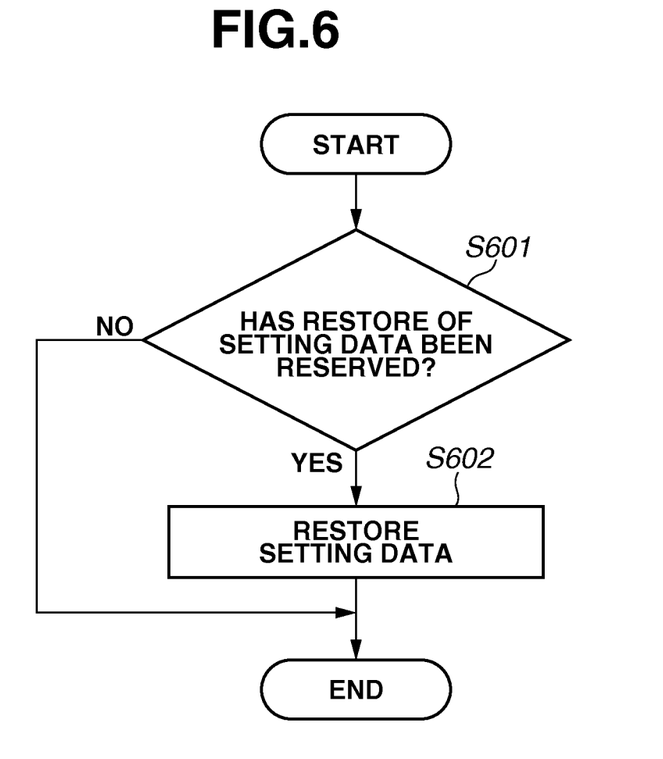
FIG. 6 is a flowchart illustrating processing to be performed by the image forming apparatus to restore setting data.

With reference to the flowchart in FIG. 6, the following describes an example of processing performed by the image forming apparatus 1 for restoring the setting data saved in the setting data saving area 302 of the SSD 160 to the setting data area 204 of the HDD 14. The processing described in the flowchart of FIG. 6 is executed after the HDD 14 is removed and installed after repair or replacement, and the repaired or new HDD 14 starts operating. The flowchart illustrated in FIG. 6 is implemented, for example, by the CPU 13 executing a program stored in the SSD 160 of the controller 3.

In step S601, the controller 3 performs second reservation determination processing for determining whether a reservation for restoring the setting data has been made. As a result of the determination, if a reservation for restoring the setting data has been made (YES in step S601), the processing proceeds to step S602. If a reservation for restoring the setting data has not been made (NO in step S601), the processing according to the flowchart in FIG. 6 is ended.

In step S602, the controller 3 restores the setting data from the setting data saving area 302 of the SSD 160 to the setting data area 204 of the HDD 14. The controller 3 cancels the reservation for restoring the setting data, and deletes the setting data from the setting data saving area 302. The reservation is cancelled, for example, by storing information indicating that there is not the reservation on a storage medium in the image forming apparatus 1 other than the HDD 14, which is the saving source of the setting data. In the above-described specific example, the controller 3 changes the information in the area storing the information which indicates whether there is the reservation from "0" to "1" to execute the reservation. Therefore, the controller 3 changes information in the area from "1" to "0" to cancel the reservation. Then, the processing according to the flowchart in FIG. 6 is ended.

In the present exemplary embodiment, even when the encryption function is enabled or disabled by the encryption board 90, a reservation for saving the setting data is made. After the setting data is saved, the reservation for restoring the setting data is made as illustrated in FIG. 5.

In this case, for example, instead of the processing in step S501, the controller 3 determines whether enabling or disabling the encryption function by the encryption board 90 has been detected.

For example, when the install button 401 is selected, and then the OK button 403 is pressed on the GUI 400 illustrated in FIG. 4, the controller 3 determines that disabling the encryption function by the encryption board has been detected. When the cancel button 402 is selected, and then the OK button 403 is pressed on the GUI 400 illustrated in FIG. 4, the controller 3 determines that enabling the encryption function by the encryption board 90 has been detected.

Then, the processing from step S502 to S507 is performed. After the processing in step S507 is performed, the encryption board 90 is installed or removed by a service staff. After the image forming apparatus 1 is restarted, the controller 3 executes the processing in the flowchart of FIG. 6. to restore the setting data. When the encryption function is enabled, the setting data saved in the setting data saving area 302 of the SSD 160 is encrypted by the encryption board 90 and stored in the setting data area 204 of the HDD 14 in step S602. On the other hand, when the encryption function is disabled, the setting data saved in the setting data saving area 302 of the SSD 160 is stored in the setting data area 204 of the HDD 14 without encryption in step S602.

As compared to the HDD 14, the SSD 160 is randomly accessible at higher speed. Further, as compared to the HDD 14, the SSD 160 can achieve lower power consumption, weight reduction, space saving, and higher shock resistance. The SSD 160 does not perform initial operation such as spin-up operation, which is necessary for HDD 14 to start up the system. Consequently, the SSD 160 can achieve high-speed data transfer, and the start-up time can be reduced. Further, the SSD 160 is less expensive than the SRAM 40, and thus an inexpensive storage device can be achieved in storing data in an image forming apparatus.

However, a NAND flash memory, which is a storage device mounted on the SSD 160, is singly slow in response. Further, the number of times of writing to the SSD 160 is limited. The number of times of writing in a single level cell (SLC), which stores a single bit per cell, is about 100,000, and the number of times of writing in a multiple level cell (MLC), which stores a plurality of bits per cell, is about 10,000. The number of times of writing tends to be further reduced in the future due to miniaturization of processes. As described above, the SSD 160 is less durable compared to the HDD 14 with respect to the number of times of writing data.

In the present exemplary embodiment, to reduce the frequency of writing of data to the SSD 160, the setting data is stored not on the SSD 160 but on the HDD 14. In such a case of storing the setting data on the HDD 14, however, if failure occurs in the HDD 14, or if the encryption function is enabled or disabled by the encryption board 90, the setting data stored on the HDD 14 may not be used.

Therefore, in the present exemplary embodiment, when failure occurs in the HDD 14, or when the encryption function is enabled or disabled by the encryption board 90, the setting data stored on the HDD 14 is saved to the SSD 160. In this processing, a reservation for saving the setting data is made. After the setting data is saved, the reservation is canceled. Further, a reservation for restoring the setting data is made. Then, if the setting data is to be restored, it is determined whether reservation for restoring the setting data has been made. If the reservation has been made, the setting data is restored to the HDD 14.

Consequently, the setting data in the event of occurrence of failure in the HDD 14, or in the event of enabling or disabling the encryption function can be assured at a low cost and in consideration of the number of times of writing to the SSD 160. Further, even if the setting data is internally rewritten during a period from occurrence of failure in the HDD 14 until a request for stopping the HDD 14 is issued, occurrence of mismatch between the last stored data when power supply is turned off and the saved data can be suppressed. Therefore, time and effort of a service staff in saving and restoring the setting data can be reduced.

For example, if both of the first storage device, which is the saving source of the setting data, and the second storage device to be used for saving a destination of the setting data are HDDs, or the second storage device to be used for saving a destination of the setting data is an SRAM, the cost increases. In the present exemplary embodiment, HDD 14 and SSD 160 are used as examples of the first storage device, which is the saving source of the setting data, and the second storage device used for saving a destination of the setting data, respectively. However, other storage devices may be used. The first storage device, which is the saving source of the setting data, and the second storage device is a saving destination of the setting data can be storage devices of the same type, or different types. For example, the second storage device used for saving the destination of the setting data may be the SRAM 40, which is an example of a nonvolatile semiconductor memory, or the second storage device may be the memory 15, which is an example of a volatile semiconductor memory. If a volatile memory such as the memory 15 is used as a saving destination of the setting data, for example, even in a case where the image forming apparatus 1 is shut off, namely instantaneous interruption of the power supply occurs in the image forming apparatus 1, the setting data can be temporarily stored in the memory 15 by supplying power to the memory 15 with a battery. The device to which the encryption function is applied is not limited to the HDD 14. As long as it is capable of encrypting and storing data, any storage device can be employed as the first storage device which is a saving source of setting data and the second storage device which is a saving destination of the setting data.

According to an example of the present embodiment, the processing illustrated in FIGS. 5 and 6 is performed in a case where failure occurs in the HDD 14, and the encryption function is enabled or disabled by the encryption board 90. However, in at least one of the cases, the processing described in FIG. 5 and FIG. 6 may be performed.

Moreover, at least one of the first storage device, which is the saving source of the setting data, and the second storage device, which is the saving destination of the setting data, can be provided outside the image forming apparatus 1. The configuration and processing described in the present exemplary embodiment may be applied to any information processing apparatuses other than the image forming apparatus 1 as long as it includes the above-described storage device. As long as the above-described encryption board 90 can be installed in such information processing apparatus, also in a case where the encryption function is enabled or disabled similar to the present exemplary embodiment, the configuration and processing according to the present exemplary embodiment can be applied to the relevant information processing apparatus.

The above-described exemplary embodiments are only exemplary examples, and it is to be understood that these exemplary embodiments are not seen to be limiting.

Other Embodiments

Additional embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-090056 filed Apr. 24, 2014, which is hereby incorporated by reference herein in its entirety.

What is claimed is:

1. An information processing apparatus comprising:
a first setting unit configured to set reservation information for making a reservation to save setting data stored in a first storage device, to a second storage device;
a first reservation determination unit configured to, after a request for stopping operation of the first storage device has been issued, determine whether the reservation information has been set;
a saving unit configured to save the setting data stored in the first storage device to the second storage device after the reservation information is set by the first setting unit; and
a stopping unit configured to stop operation of the first storage device after the setting data stored in the first storage device is saved to the second storage device by the saving unit.

2. The information processing apparatus according to claim 1, further comprising:
a stop request determination unit configured to determine whether the request for stopping the operation of the first storage device has been issued,
wherein the saving unit, after the first reservation determination unit determines that the reservation information has been set, saves the setting data stored in the first storage device to the second storage device.

3. The information processing apparatus according to claim 1, further comprising:

a second setting unit configured to set second reservation information for making a reservation to restore the setting data saved in the second storage device to the first storage device during a period from when the saving unit saves the setting data stored on the first storage device onto the second storage device until the stopping unit stops the operation of the first storage device;
a second reservation determination unit configured to determine whether the second reservation information has been set, after the stopping unit stops the operation of the first storage device, and then the first storage device, a repaired first storage device, or a new first storage device becomes ready to operate; and
a restoring unit configured to restore the setting data saved in the second storage device by the saving unit to the first storage device, after the second reservation determination unit determines that the second reservation information has been set.

4. The information processing apparatus according to claim 3, further comprising:
a failure determination unit configured to determine whether failure has occurred in the first storage device,
wherein the first setting unit, if the failure determination unit determines that failure has occurred in the first storage device, sets the reservation information, and
the second reservation determination unit determines whether the second reservation information has been set, after the stopping unit stops the operation of the first storage device, and then a repaired first storage device, or a new first storage device becomes ready to operate.

5. The information processing apparatus according to claim 3, further comprising:
an encryption unit configured to encrypt the data to be stored on the first storage device,
wherein the first setting unit sets the reservation information when a setting controlling whether to execute encryption by the encryption unit is changed, and
the second reservation determination unit determines whether the second reservation information has been set, after the stopping unit stops the operation of the first storage device, and then operation of the encryption unit based on the setting controlling whether to execute the encryption and operation of the first storage device become ready.

6. The information processing apparatus according to claim 1, wherein, a number of times of writing data by the first storage device is greater than a number of times of writing data by the second storage device.

7. An information processing method comprising:
setting reservation information for making a reservation to save setting data stored in a first storage device, to a second storage device;
determining, after a request for stopping operation of the first storage device has been issued, whether the reservation information has been set;
saving the setting data stored in the first storage device to the second storage device after the reservation information is set; and
stopping operation of the first storage device after the setting data stored in the first storage device is saved to the second storage device.

8. A non-transitory computer-readable storage medium storing computer executable instructions that cause a computer to execute an information processing method comprising:

setting reservation information for making a reservation to save setting data stored in a first storage device, to a second storage device;

determining, after a request for stopping operation of the first storage device has been issued, whether the reservation information has been set;

saving the setting data stored in the first storage device to the second storage device after the reservation information is set; and stopping operation of the first storage device after the setting data stored in the first storage device is saved to the second storage device.

* * * * *